United States Statutory Invention Registration [19]

[11] Reg. Number: H511

Stello

[43] Published: Aug. 2, 1988

[54] DATA COLLECTION SYSTEM

[75] Inventor: Samuel L. Stello, Fredericksburg, Va.

[73] Assignee: The United States of America as represented by the Secretary of the Navy, Washington, D.C.

[21] Appl. No.: 629,284

[22] Filed: Jul. 9, 1984

[51] Int. Cl.[4] ..... G06F 3/00

[52] U.S. Cl. ..... 364/200

[58] Field of Search ... 364/200 MS File, 900 MS File, 364/131, 132, 133, 134

[56] References Cited

U.S. PATENT DOCUMENTS

| | | | |
|---|---|---|---|
| 3,699,532 | 10/1972 | Schaffer et al. | 364/200 |
| 3,715,729 | 2/1973 | Mercy | 364/200 |
| 3,810,101 | 5/1974 | Avery | 364/200 |
| 4,075,691 | 2/1978 | Davis et al. | 364/200 |
| 4,241,418 | 12/1980 | Stanley | 364/900 |
| 4,351,025 | 9/1982 | Hall, Jr. | 364/200 |
| 4,354,225 | 10/1982 | Frieder et al. | 364/200 |
| 4,368,514 | 1/1983 | Persaud et al. | 364/200 |
| 4,432,064 | 2/1984 | Barker et al. | 364/550 |
| 4,456,951 | 6/1984 | Henneberger et al. | 364/131 |
| 4,458,308 | 7/1984 | Holtey et al. | 364/200 |

*Primary Examiner*—Stephen C. Buczinski
*Assistant Examiner*—Linda J. Wallace
*Attorney, Agent, or Firm*—Kenneth E. Walden; Frederick A. Wein; John G. Wynn

[57] ABSTRACT

A data collection system is configured using, inter alia, a master processor and a plurality of slave processors one for each data source to be collected. The slave processors depend upon the master processor for system timing and interpretation of operator commands via a display/keyboard. Each slave processor is a dedicated independent microcomputer whose software is customized for the data collection required. Overhead software for the slave processor is minimized by the use of a simple command structure between the master processor and the plurality of slave processors.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

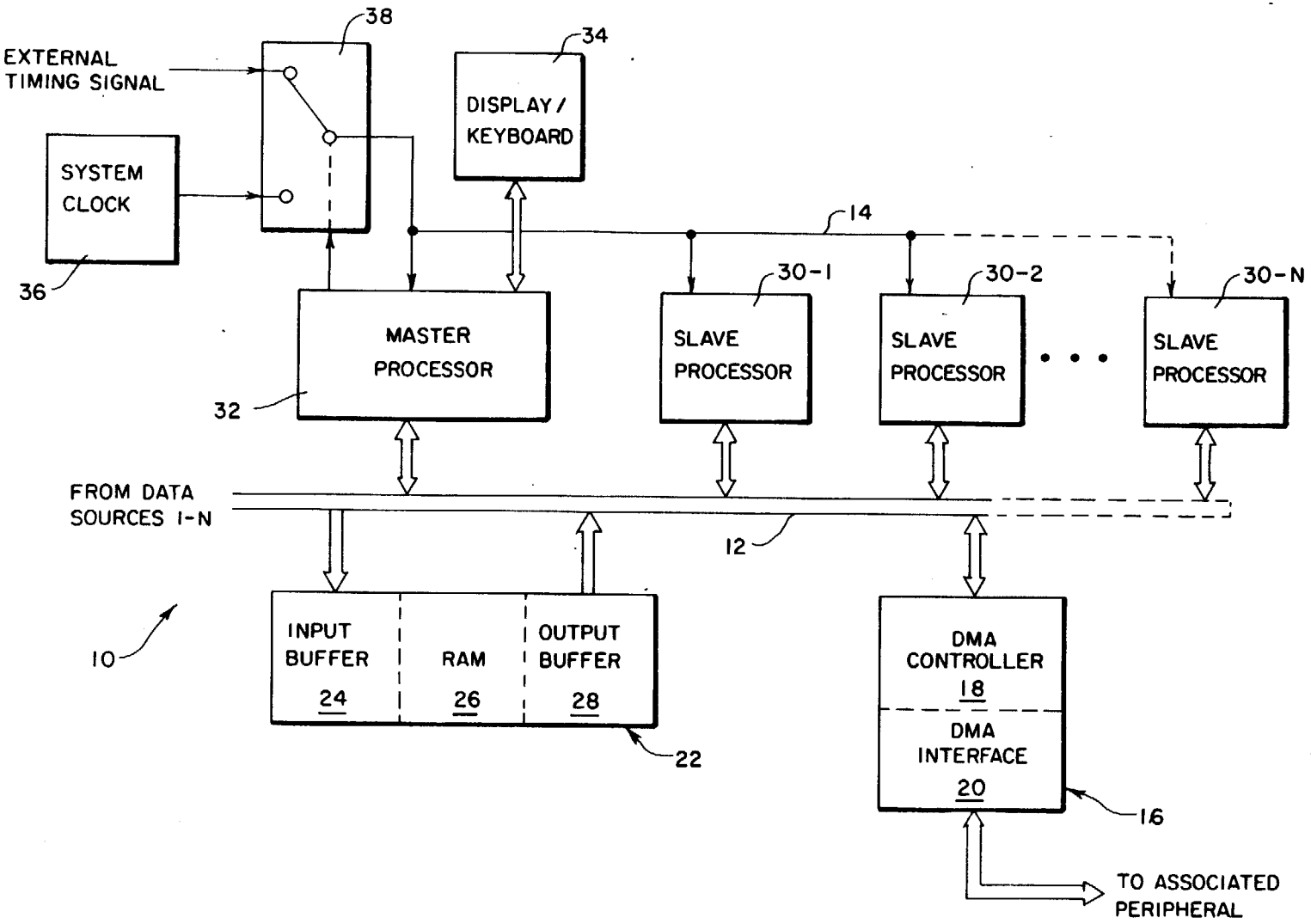
SLAVE PROCESSOR
30-N
SLAVE PROCESSOR
30-2
SLAVE PROCESSOR
30-1
14
12
DMA CONTROLLER 18
DMA INTERFACE 20
16
TO ASSOCIATED PERIPHERAL
OUTPUT BUFFER 28
RAM 26
INPUT BUFFER 24
22
DISPLAY / KEYBOARD
34
MASTER PROCESSOR
32
38
SYSTEM CLOCK
36
EXTERNAL TIMING SIGNAL
FROM DATA SOURCES 1-N
10

DATA COLLECTION SYSTEM

BACKGROUND OF THE INVENTION

1. Field of the Invention

The present invention relates to data collection systems, but more specifically, it relates to data collection systems which use master units and secondary units configured to respond to the master unit.

2. Description of the Prior Art

Gun fire control system development is a primary research and development task for the Department of the Navy scientific and engineering personnel. Data on system performance in a sea environment is required for maintenance of gun fire control systems, to improve the performance thereof and for validation of new designs. In the past, the Naval Gunnery Analysis System (NGAS) was a laboratory tool configured to acquire performance data on the MK 68 analog gun fire control systems. The instrumentation consisted of cameras, simultaneously triggered to take pictures of computer dials. Consequently, parallax, low data rates and lack of intermediate values were severe drawbacks. In the most recent past, an electronic system was developed using discrete transistor to transistor logic (TTL) and an electronic recording media. The foregoing system was used successfully in the Navy's 8 inches Major Caliber Lightweight Gun tests. However, the system's inherent lack of flexibility was a severe constraint, consequently, the single purpose expensive data acquisition system proved to be too inflexible for the wide variety of testing needed in the Navy.

OBJECTS OF THE INVENTION

Accordingly, the principal object of the present invention is to configure a data collection system to be modular in design so that the data collection interfaces can be built independently such that the data collection system can be customized quickly as needed without disturbing the in place operating components.

SUMMARY OF THE INVENTION

In accordance with the above stated objects, other objects, features and advantages, the purpose of the invention is to configure a data collection system that is modular in design and allows data collection interfaces to be built independently.

The essence of the present invention is in the use of master and slave processors, which, due to the independence of each slave processor, allow the conflicting timing requirements of multiple data sources to be eliminated. The purpose of the present invention is carried out by configuring the data collection systems to comprise a master processor, a plurality of slave processors, a random access memory device (RAM) and a direct memory access (DMA) controller. The RAM device includes "mailbox" locations for processor communications. In addition, the RAM device includes data buffers. The DMA controller is a mechanism for data transfer from the data buffers of the RAM device to an associated peripheral device.

BRIEF DESCRIPTION OF THE DRAWINGS

The previously stated objects, other objects, features and advantages of the present invention will be apparent from the following more particular description of the preferred embodiment as illustrated in the accompanying drawings, in which:

FIG. 1 is a block diagram representation of a data collection system according to the present invention depicting, inter alia, the master processor and the plurality of slave processors thereof.

DESCRIPTION OF THE PREFERRED EMBODIMENT

FIG. 1 shows an embodiment of a data collection system 10 in which the present invention is employed to collect data from multiple data sources while eliminating the usual conflicting timing requirements thereof.

Specifically, the data collection system 10 comprises a system data/address/control bus 12, a system interrupt line 14, a direct memory access (DMA) unit 16 further including a DMA controller 18 and DMA interface 20. As shown, the DMA unit 16 is operatively connected between the system data/address/control bus 12 and an associated peripheral device (not shown).

The data collection system 10 further comprises a memory device 22 including an input buffer 24, a random access memory (RAM) 26 and an output buffer 28. The memory device 22 is configured for temporary storage of the data from the plurality of data sources 1 through N, inter alia, on the aforementioned system data/address/control bus 12. Also, the system is configured such that when the input buffer 24 is being filled with data, data in said output buffer, in cooperation with the RAM 26, is being copied to said DMA unit 16. To continue, a plurality of slave processors 30-1 through 30-N are operatively connected between the system data/address/control bus 12 and the system interrupt line 14. It should be noted that each one of the plurality of slave processors 30-1, 30-2 through 30-N is a dedicated independent microcomputer whose software is customized for the particular data collection job.

A master processor 32 is operatively connected between the system data/address/control bus 12 and the system interrupt line 14. The master processor 32 contains a predetermined program for controlling the timing and interpreting commands for the plurality of slave processors 30-1, 30-2 through 30-N.

The RAM 26 of the memory device 22 includes a plurality of "mailbox" locations 26-1, 26-2 through 26-N, one for each of the plurality of slave processors 30-1 through 30-N. In operation, the plurality of "mailbox" locations 1 through N are configured such that the master processor 32 deposits commands therein so as to be read by particular ones of the slave processors 30-1 through 30-N, aforementioned. Accordingly, the slave processors 30-1 through 30-N depend upon the master processor 32 for system timing and interpretation of operator commands via a display/keyboard 34, which is operatively connected to the master processor 32. A system clock 36 is connected to the master processor 32 via one terminal of a timing switch 38. As shown, the other terminal of the timing switch 38 is connected to an external timing source. Thus, under operator control from the display/keyboard 34, via the master processor 32, a periodic signal for synchronization can be switched into the system from the system clock 36 or from the external timing source. This switching is necessary because of a difference in timing requirements for the different data sources 1 through N.

The overhead software for the slave processors 30-1 through 30-N is minimized by the use of the simple command structure between the master processor 32 and the slave processors 30-1 through 30-N. It should also be noted that none of the slave processors 30-1 through 30-N communicate with each other nor are they depended upon each other. Since there is no communications between the slave processors 30-1 through 30-N, each can be developed independently and simultaneously. Thus, the primary asset of the data collection system 10 is its ability to mix slave processors and quickly develop new ones to customize the system as needed.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A data collection system for collecting and distributing data from a plurality of data sources 1 through N comprising:

a system data/address/control bus;

a system interrupt line;

a direct memory access (DMA) unit operatively connected to said system data/address/control bus configured so as to allow data transfers independently according to a predetermined program;

a memory device, operatively connected to said system data/address/control bus and being configured to allow data to be stored or retrieved;

a plurality of slave processors 1 through N operatively connected between said system data/address/control bus and said system interrupt line, each one of said plurality of slave processors 1 through N being independent and dedicated to collecting data only from corresponding ones of the data sources 1 through N, and each one of said plurality of slave processors 1 through N having a predetermined program customized for the corresponding ones of said plurality of data sources 1 through N; and a master processor operatively connected between said system data/address/control bus and said system interrupt line, said master processor having a predetermined program for controlling the timing and interpreting commands for said plurality of slave processors 1 through N.

2. The data collection system of claim 1 wherein said direct memory access unit comprises:

a DMA controller operatively connected to said system data/address/control bus; and a DMA interface operatively connected between said DMA controller and an associated peripheral device and coacting such that data transfers from said memory device are accomplished automatically and transparent to said master processor without intervention thereof.

3. The data collection system of claim 2 wherein said memory device comprises:

an input buffer operatively connected to said system data/address/control bus for temporary storage of data therefrom;

a random access memory (RAM) operatively connected to said input buffer for temporary storage of data therefrom; and an output buffer operatively connected between said RAM and said system data/address/control bus such that as said input buffer is being filled with data, said output buffer is being copied to said DMA unit.

4. The data collection system of claim 3 wherein said RAM includes a plurality of "mailbox" locations 1 through N one for each of said plurality of slave processors 1 through N, said plurality of "mailbox" locations 1 through N being configured such that said master processor deposits commands therein so as to be read by the particular ones of said slave processors 1 through N.

5. The data collection system of claim 4 further comprising a display/keyboard operatively connected to said master processor for directing and monitoring the operating modes thereof according to the predetermined program therein.

6. The data collection system of claim 5 further comprising a system clock operatively connected to said master processor for generating periodic signals used for synchronization, and a timing switch operatively connected between said system clock and said master processor, and being operatively connected between an external timing source and said master processor so as to switch between the system clock and the external timing source under control of said master processor.

* * * * *